Feb. 7, 1961

A. WENZEL 2,970,423

PICK-UP BALER

Filed Aug. 7, 1957

Inventor:
ALFRED WENZEL
by
Mestern & Kollin
ATTORNEYS

Feb. 7, 1961 A. WENZEL 2,970,423
PICK-UP BALER
Filed Aug. 7, 1957 3 Sheets-Sheet 2

Inventor:
ALFRED WENZEL
by Mestern & Kollin
ATTORNEYS

Feb. 7, 1961  A. WENZEL  2,970,423
PICK-UP BALER
Filed Aug. 7, 1957  3 Sheets-Sheet 3
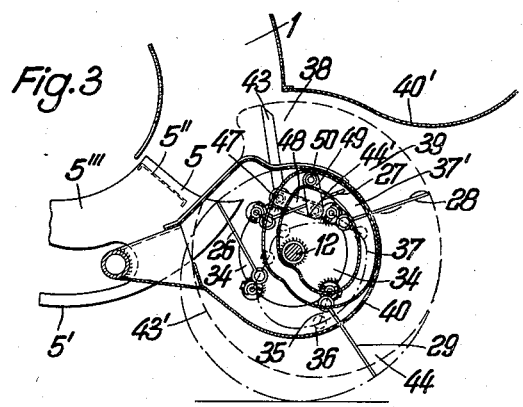
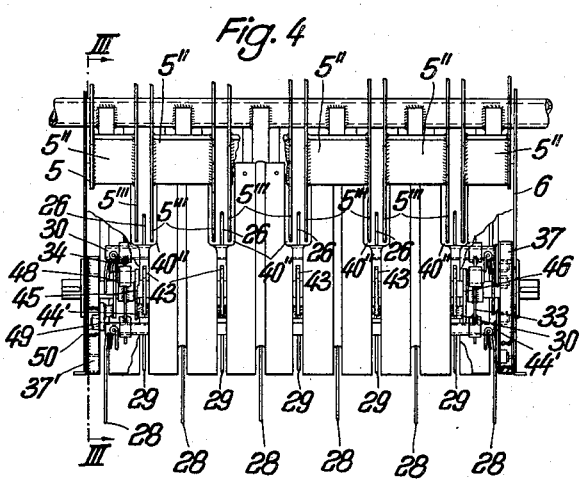
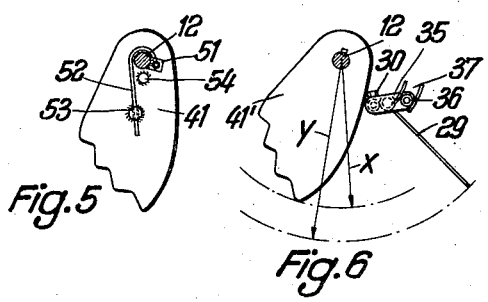
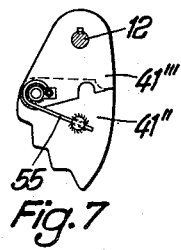
Inventor:
ALFRED WENZEL
by Mestern & Kollin
ATTORNEYS United States Patent Office 2,970,423
Patented Feb. 7, 1961

2,970,423
PICK-UP BALER

Alfred Wenzel, Wolfenbuttel, Germany, assignor to Gebrüder Welger, Maschinenfabrik, Wolfenbuttel, Germany Filed Aug. 7, 1957, Ser. No. 676,788

Claims priority, application Germany Jan. 12, 1957

8 Claims. (Cl. 56—341)

The present invention relates to a mobile pick-up baler, and more particularly to a baler which is adapted to be pulled by a tractor and provided with a revolving pick-up assembly which picks the hay, straw, or other material to be harvested off the ground while traveling along the same.

The balers of known designs all required a special conveyer between the revolving pick-up assembly and the baling chamber, and the hay, straw, or the like which had been picked up by the pick-up assembly and been placed upon a collecting table or into a collecting trough was then pushed along such table into the baling chamber and into the path of travel of the baling plunger which reciprocated within the baling chamber.

It is one of the principal objects of the present invention to provide a pick-up baler in which such a special conveyer between the revolving pick-up assembly and the baling chamber will be unnecessary and may be entirely omitted.

The pick-up baler according to the present invention has the great advantage over previous balers of saving considerably in the cost of material and labor which was previously required for building a separate conveyer, and also in the power previously required for operating such conveyer. Also, due to the omission of a separate conveyer, the pick-up assembly is disposed much more closely to the baling chamber than was previously possible. Therefore, the distance which the straw or hay has to cover from the ground to the baling chamber will be much shorter with the result that the wear upon the machine will also be reduced. Furthermore, through such omission of a separate conveyer between the pick-up assembly and the baling chamber, the baling machine will be much more compact and of a considerably lower weight, requiring less tractive power to move the same.

Generally speaking, the above-mentioned objects and advantages of the present invention are attained by the fact that at least one group of pick-up fingers of the revolving pick-up unit will not only lift the straw, hay, or the like from the ground but will also convey the entire material thus elevated into the baling chamber and into the path of travel of the baling plunger.

Further objects, features, and advantages of the present invention will be apparent from the following detailed description thereof, particularly when read with reference to the accompanying drawings, in which—

Fig. 3 shows a partial view of a modification of the pick-up baler according to the invention as seen in a vertical cross section taken along line III—III of Fig. 4;

Fig. 4 shows a plan view of the pick-up baler according to Fig. 3; while

Figs. 5, 6, and 7 show three different modifications of one of a group of feeding fingers of the pick-up assembly according to the invention.

Figure 1:
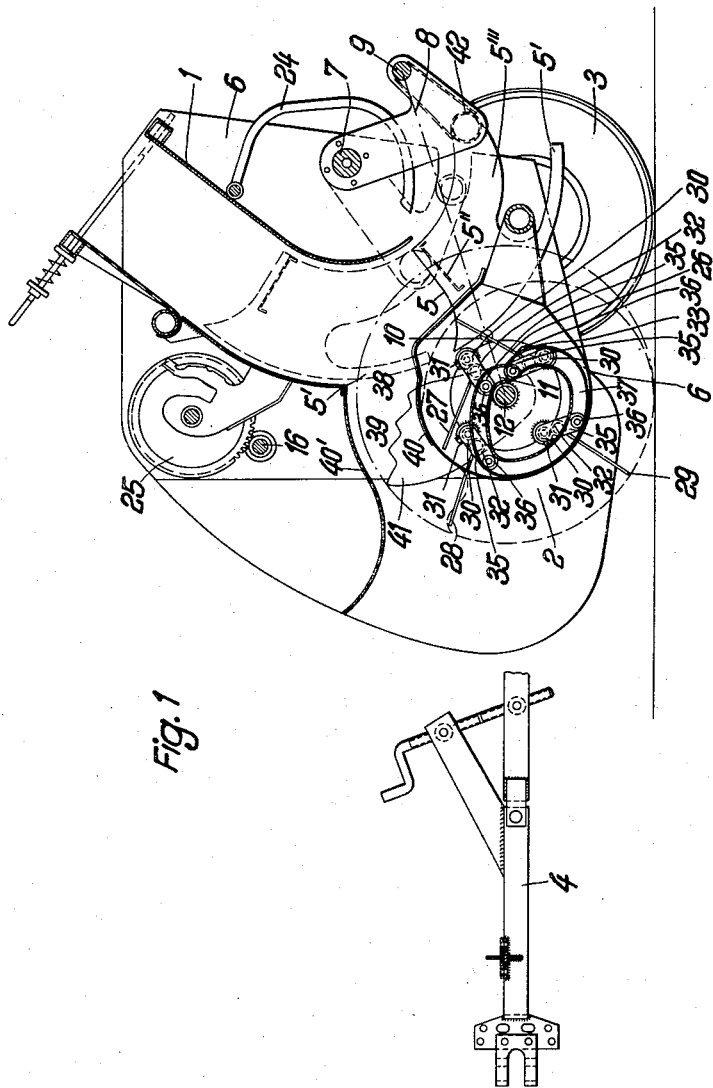
Fig. 1 shows diagrammatically a pick-up baler according to the invention as seen in a vertical cross section taken along line I—I in Fig. 2.
Figure 2:
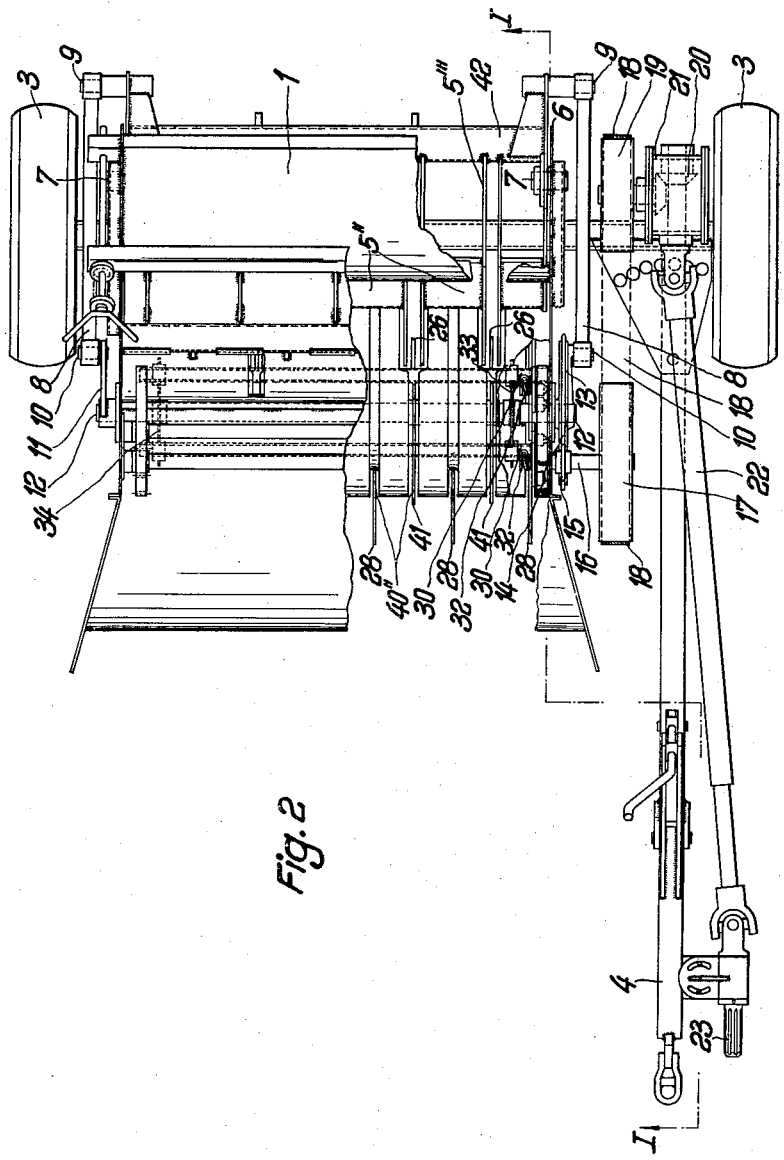
Fig. 2 shows a plan view of the pick-up baler according to Fig. 1, in which a portion of the outer wall of the baling chamber is broken away to show the pick-up assembly.

Referring to the drawings, and first particularly to Figs. 1 and 2, the pick-up baler according to the invention comprises generally a baling chamber 1 and a pick-up assembly designated in its entirety by the reference numeral 2. These two units are mounted on a pair of side wheels 3 and may be hitched to a tractor or the like by means of a side pole 4. A plunger 5 is slidably mounted in baling chamber 1 and adapted to reciprocate along an arcuate path about a shaft 7 which is mounted within the frame 6 of the machine. During its forward-upward movement, plunger 5 pushes the hay, straw, or the like into baling chamber 1 and compresses the same therein to form bales which it then pushes along chamber 1 until they are ejected from the upper end of this chamber after each bale has been tied in the usual manner with a cord or wire.

For producing the reciprocatory movement of plunger 5, the same is connected at its opposite ends by means of pivot pins 9 to a pair of connecting rods 8 which, in turn, are pivotally connected by means of pivot pins 10 to a pair of crank arms 11 and 13, respectively. These crank arms 11 and 13 are secured to the opposite ends of the main drive shaft 12 of the machine and are rotated thereby.

For driving the main shaft 12, crank arm 13 consists of a sprocket wheel which is driven by another sprocket wheel 15 by means of a chain 14. Sprocket wheel 15 is mounted on a jackshaft 16 which is rotatably mounted within the machine frame 6 and the free end of which carries a belt pulley 17. This pulley 17 is driven through a belt 18 by a belt pulley 19 which, in turn, is driven by a bevel gearing 20 which is enclosed in a dustproof housing 21 mounted on machine frame 6. Bevel gearing 20 is driven through a universal-joint shaft 22 by a shaft 23 which may be connected to a power take-off on the leading tractor or to any other source of power, not shown.

The means for passing the cord or wire around the bales which have been compressed in chamber 1 and for tying the ends of such rope or wire to each other may be of any suitable type known in the art and, as they do not form a part of the present invention, they have only been indicated diagrammatically in the drawings by curved needles 24 which are adapted to pass the cord or wire in the usual manner through suitable slots in the opposite walls of baling chamber 1 toward the tying mechanism 25 which then ties the ends of the cord or wire and thereafter cuts such cord or wire from a supply thereof, not shown.

The pick-up assembly 2 according to the first embodiment of the invention as illustrated in Figs. 1 and 2 consists of four groups of pick-up fingers 26, 27, 28 and 29 which are rotatable about the main drive shaft 12. Each of these groups of pick-up fingers comprises a plurality of individual fingers which are disposed in a row at certain distances from each other and the number of which depends upon the width of the pick-up assembly. The individual fingers of each group 26, 27, 28, and 29 are secured, for example, by a bolt 31 to one of four tubular shafts 30 which extend along the entire width of pick-up assembly 2. Each finger is made of spring wire which at its inner end is coiled to form one or more turns 32 in order to increase its resiliency. The outer ends of tubular shafts 30 are rotatably mounted in bearings 30' secured to disks 33 and 34 which, in turn, are nonrotatably mounted on the main drive shaft 12. Thus, tubular shafts 30 with fingers 26, 27, 28, and 29 thereon revolve around and together with main shaft 12. Each tubular shaft 30 with its respective group of spring fingers is rotatably mounted in disks 33 and 34 so as to permit the fingers to turn from a radial pick-up position to a more tangential position. For this purpose, tubular shafts 30 are extended at one side of the machine beyond disk 33, and the projecting end of each shaft 30 is provided with a control arm 35 which carries a rotatable roller 36 on its free end. Rollers 36 of all control arms 35 engage in a common cam slot 37 in a suitable member which is mounted in a stationary position on machine frame 6.

This cam slot 37 is designed so that each of the four groups of spring fingers 26, 27, 28, and 29 will be held therein in the radial pick-up position when such group is in its lowest position relative to the ground, and in a more tangential position when such group approaches an area 39 in front of the inlet opening 38 of baling chamber 1. This area 39 is located at the bottom of baling chamber 1 and is partly enclosed by a wall 40 which encloses the pick-up assembly 2 and a resilient wall 40' opposite to wall 40 of machine frame 6. Wall 40 is provided with a plurality of slots 40" in accordance with the number of spring fingers in each group 26 to 29. Spring fingers 26 to 29 project through slots 40" in wall 40 in order to pick the material to be harvested off the ground and to take it along and lift it into area 39 where it accumulates and rests against the lower surface 5' of plunger 5. By thus accumulating within area 39, the material will also be slightly compressed therein. Shortly before one of the groups of spring fingers enters into the collecting area 39, these fingers will be pivoted from the radial position downwardly to a more tangential position by a sharp rearward bend in cam slot 37 as shown in Fig. 3 acting through roller 36 upon control arm 35. By such pivotal movement, this respective group of fingers will then be drawn underneath the upper portion of wall 40.

When the respective group of fingers, for example, group 27, has disappeared behind wall 40, plunger 5 will have returned to its starting position, as shown particularly in Fig. 1, whereby the inlet opening 38 at the bottom of baling chamber 1 will be opened. In the meantime, a group of feeding fingers 41 has reached area 39 and will now convey the hay or straw which it has picked up from the ground together with the material which has already been collected in area 39 through the inlet opening 38 into baling chamber 1 in front of plunger 5.

While the first-mentioned groups of pick-up fingers 26 to 29 consist of resilient spring steel, the group of feeding fingers 41 should be less resilient or even rigid so that these fingers will not yield under the pressure of the material collected in area 39 but convey such material properly into the path of travel of plunger 5. The feeding fingers of this group 41 therefore preferably consist of rigid, disklike plates which are likewise mounted in a row in a spaced relation to each other on the main drive shaft 12 of the machine. During its compression stroke, plunger 5 rakes the hay or straw from these feeding fingers 41 and pushes it into baling chamber 1.

Plunger 5 is also made of a plurality of disklike plates 5''' of sheet metal which are mounted in a row in a spaced relation to each other on a tubular shaft 42. Plates 5''' of the plunger are connected with each other by means of cross members 5'' of substantially U-shaped cross section, for example, by welding. Plates 5''' on shaft 42 and cross members 5'' are disposed in such a relation to each other that plates 5''' will not interfere with the movement of feeding fingers 41 through the space between each pair of adjacent plates 5''', as illustrated in Fig. 2.

While a plunger of a similar design and the use of feeding fingers or similar elements separate from the actual pick-up elements and in operative association with such a plunger already may be known as such, it constitutes a new and inventive feature of considerable importance in this art that one or more groups of feeding fingers of a revolving pick-up assembly 2 conveys the material, which has been picked off the ground by them as well as by several groups of resilient spring fingers, directly into the baling chamber 1 and in front of plunger 5.

The modification of the invention as illustrated in Figs. 3 and 4, in which all of the parts which are substantially similar to those illustrated in Figs. 1 and 2 are also designated by the same reference numerals as used in Figs. 1 and 2, differs from such first embodiment of the invention primarily by the fact that not only the different groups of resilient pick-up fingers 26, 27, 28, and 29, but also the group of the more rigid feeding fingers 43 of the pick-up assembly 44 which convey the hay or straw into the baling chamber and in front of the plunger are controlled by a cam slot 37' in a suitable member which is mounted on machine frame 6. For this purpose, feeding fingers 43 are disposed in a row adjacent to but spaced from each other and are secured to a tubular shaft 44' which is pivotably mounted, as subsequently described, in bearing disks 33 and 34 which are secured to the main drive shaft 12 of the machine. These disks 33 and 34 also rotatably support shafts 30 of the resilient pick-up fingers 26 to 29 in the manner as above described with respect to Figs. 1 and 2. The movement of these pick-up fingers 26 to 29 is likewise controlled as in Figs. 1 and 2 by a cam slot 37 which is indicated in Fig. 3 only by a central dot-and-dash line. The supporting member containing the second cam slot 37' which controls the operation of the rigid feeding fingers 43 is secured to machine frame 6 at the side opposite to cam slot 37. For this purpose, each end of tubular shaft 44' carrying the feeding fingers 43 is provided with a crank arm 45 or 46, respectively, and each of these crank arms is pivotably mounted by means of a crank shaft in bearing disks 33 and 34. Shaft 47 of crank arm 45 carries at the outside of bearing disk 34 a second crank arm 48 which is rigidly connected to a control rod 49 which, in turn, engages by means of a roller 50 into the second cam slot 37'. This cam slot 37' is designed so that the group of rigid feeding fingers 43 will not reach as far down to the ground as pick-up fingers 26 to 29 so that these rigid fingers 43 will not as easily hit against an obstruction on the ground, such as a rock or the like. This will be attained by the provision of a sharper bend at one end of cam slot 37' whereby the feeding fingers 43 will not be shifted to their radial conveying position until they are approaching the collecting area 38. They will then remain in such radial position until they have moved into baling chamber 1, whereupon by another sharp bend in cam slot 37' they will be drawn back behind wall 40. The entire path of movement of the outer ends of feeding fingers 43 may be easily understood by tracing the dotted line 43' in Fig. 3.

The slotted wall 40 which encloses the pick-up assembly in both embodiments of the invention as illustrated in Figs. 1 to 4 may extend into the path of travel of plunger 5 so that the projecting portions of plates 5''' of the plunger will to some extent engage into the wider rear portions of some of slots 40" and thus into the area surrounded by wall 40 so that during the return movement of plunger 5 to its starting position, any hay or straw which might still adhere to plates 5''' will be held back by wall 40 and thus be raked off the plunger plates.

In the embodiment as illustrated in Figs. 3 and 4, the two resilient pick-up fingers of groups 26 and 27 have been omitted within those vertical planes along which the rigid feeding fingers 43 circulates so that within those planes there will only be the pick-up fingers of groups 28 and 29.

As illustrated in Fig. 5, the group of rigid feeding fingers 41 or 43, respectively, which convey the hay or straw into baling chamber 1 and into the path of travel of plunger 5 may also be resiliently mounted on the main drive shaft 12 of the machine so as to permit these fingers to yield when coming into contact with solid obstructions on the ground. For this purpose, feeding fingers 41 are not rigidly connected to the main shaft 12, but are rotatably mounted thereon. Shaft 12 may then have carrier plates 51 secured thereto, each of which, in turn, carries a spring rod 52, the free end of which loosely engages in an aperture in another member 53 which is secured to finger 41. If feeding fingers 41 should then hit against an obstruction, they will be able to carry out a resilient yielding movement, the extent of which may be limited by a stop 54 on finger 41 which will then engage with carrier plate 51.

Instead of mounting the entire group of feeding fingers resiliently on the main shaft 12 of the machine, it is also possible, as illustrated in Fig. 6, to make feeding fingers 41' slightly shorter in the radial direction than the resilient pick-up fingers 26 to 29, so that these feeding fingers will not as easily come into contact with an obstruction on the ground.

Finally, as illustrated in Fig. 7, each feeding finger which conveys the hay or straw into baling chamber 1 may consist of two parts 41'' and 41''', wherein only part 41'' which forms the outer end of the finger is resiliently mounted by being connected to the rigid part 41''' on shaft 12 by means of a spring 55 and is thus capable of yielding when hitting against a solid obstruction on the ground.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A pick-up mechanism for a pick-up baler comprising a frame, a baling chamber within said frame, a plunger within said baling chamber, motive means operatively connected to said plunger for reciprocating said plunger within said chamber, said baling chamber having an inlet opening in one wall thereof, said wall forming the bottom of said chamber, pick-up means adjacent to said baling chamber, a slotted wall substantially enclosing at least one group of pick-up fingers of said pick-up means but allowing said pick-up means at least during a part of their movement to extend through the slots in said wall, at least one wall of said frame and said slotted wall together defining a partly open collecting chamber for accumulating a material picked off the ground by said pick-up means, said inlet opening of said baling chamber being adapted to be temporarily closed by said plunger relative to said collecting chamber during the compression stroke of said plunger, control means connected to said pick-up means for controlling the movement of said pick-up means to lift the material off the ground and convey the same into said collecting chamber, said pick-up means comprising a plurality of pick-up fingers for picking said material off the ground and conveying it into said collecting chamber, said pick-up means further comprising pick-up and feeding fingers for also picking said material off the ground and conveying it into said collecting chamber, and for then conveying said material accumulated by all of said fingers within said collecting chamber through said inlet opening into said baling chamber and into the path of movement of said plunger while said plunger moves back to its starting position and thereby frees said inlet opening into said baling chamber, said control means comprising means for maintaining said pick-up fingers in a conveying position during the lifting movement thereof and for pivoting said pick-up and feed fingers during the entry thereof into said collecting chamber so as to draw said pick-up fingers behind said slotted wall.

2. A pick-up baler as defined in claim 1, further comprising a main drive shaft operatively connected to said groups for rotating said groups of pick-up fingers and pick-up and feed fingers, and means mounted on the ends of said shaft for reciprocating said plunger.

3. A pick-up baler as defined in claim 1, wherein said pick-up fingers form a plurality of groups, each mounted on a separate shaft, said control means comprising a cam mounted at one side of said frame, and control arms mounted on the ends of said shafts and actuated by said cam to vary the angular position of said pick-up fingers.

4. A pick-up baler as defined in claim 1, wherein said revolving means include a shaft, means for connecting said pick-up fingers of each group to each other, means for connecting all of said groups to said shaft comprising a pair of supporting members mounted on said shaft near the opposite ends thereof and each forming bearings, said connecting means rotatably mounted in said bearings, said control means comprising a cam mounted at one side of said frame, means controlled by said cam for controlling the movement of said pick-up fingers so that the latter will convey the material from the ground into said collecting chamber in front of said inlet opening of said baling chamber, a second cam mounted at the side of said frame opposite to said first cam, means controlled by said second cam for controlling the movement of said group of feeding fingers for conveying said material from said collecting chamber into said baling chamber and into the path of travel of said plunger after said plunger during its reciprocating movement has moved to a point behind said inlet opening and has thus freed said inlet opening.

5. A pick-up mechanism for a pick-up baler as defined in claim 1, wherein said pick-up and feeding fingers are mounted so as to yield resiliently into a direction opposite to their direction of rotation.

6. A pick-up baler as defined in claim 1, wherein each of said feeding fingers consists of at least two parts, one of said parts being rigidly mounted on the means for supporting all of said feeding fingers, and the other part being movably mounted on said first part, and a spring connecting said second part to said first part to permit said second part to yield resiliently into a direction opposite to the direction of rotation of said finger.

7. A pick-up mechanism for a pick-up baler as defined in claim 1, wherein said feeding fingers are designed so that during the working stroke their ends move at a greater distance from the ground than pick-up fingers which only move the material into said collecting chamber in front of said inlet opening into said baling chamber.

8. A pick-up mechanism for a pick-up baler as defined in claim 1, wherein said plunger comprises a plurality of disklike members spaced from each other, said slotted wall enclosing said pick-up means extending into the path of movement of said disklike members, said members being adapted during the reciprocating movement of said plunger to project through the slots of said slotted wall into the area enclosed by said wall.

References Cited in the file of this patent

UNITED STATES PATENTS

| | | |
|---|---|---|
| 2,256,829 | Hyman | Sept. 23, 1941 |
| 2,487,938 | Nikkel | Nov. 15, 1949 |
| 2,499,615 | Tuft | Mar. 7, 1950 |
| 2,633,691 | Lytle | Apr. 7, 1953 |
| 2,725,009 | Bornzin | Nov. 29, 1955 |
| 2,735,533 | Collins et al. | Feb. 21, 1956 |
| 2,775,339 | Cadier | Dec. 25, 1956 |
| 2,839,981 | Harstick et al. | June 24, 1958 |

FOREIGN PATENTS

| | | |
|---|---|---|
| 423,692 | Great Britain | Feb. 6, 1935 |
| 447,365 | Great Britain | May 18, 1936 |
| 688,154 | Great Britain | Feb. 25, 1953 |
| 146,177 | Sweden | July 13, 1954 |
| 757,969 | Great Britain | Sept. 26, 1956 |